W. E. HEDGER.
AIR VALVE.
APPLICATION FILED FEB. 26, 1914.

1,126,464.

Patented Jan. 26, 1915.

WITNESSES

INVENTOR
Ward E. Hedger
BY
ATTORNEYS

UNITED STATES PATENT OFFICE.

WARD EATON HEDGER, OF WAUPUN, WISCONSIN.

AIR-VALVE.

1,126,464. Specification of Letters Patent. Patented Jan. 26, 1915.

Application filed February 26, 1914. Serial No. 821,181.

*To all whom it may concern:*

Be it known that I, WARD EATON HEDGER, a citizen of the United States, and at present residing at Waupun, in the county of Dodge and State of Wisconsin, have invented a new and Improved Air-Valve, of which the following is a full, clear, and exact description.

My invention relates to an improved valve especially adapted for inflating pneumatic tires, although useful for other purposes of an air valve, and it is an object of my invention to provide a device for the indicated purpose, improved in various particulars, to the end that efficiency in operation may be promoted, as well as convenience in assembling the parts, and simplicity of adjustment.

In carrying out my invention use is made of a valve stem or body having a longitudinal bore for the inlet and outlet of air, and a valve chamber complementary to the bore. The valve chamber is enlarged at its outer end and it receives a longitudinally movable valve stem carrying a valve disposed in the enlarged end of the chamber. A valve seat is provided on a bonnet, the bonnet having a longitudinal bore and being formed with a nipple to receive a dustcap or to connect with a pump. On the valve stem guide disks are formed to give the stem parallel guided movement in the chamber, and a spring beneath the innermost disk tends to seat the valve. The valve stem at its inner end is disposed relatively to the bore of the valve body so as not to obstruct the said bore, and is adapted to limit the inward movement of the valve.

The invention resides in the distinctive features characterizing the novel construction and arrangements of the parts.

Reference is to be had to the accompanying drawings forming a part of this specification, in which similar characters of reference indicate corresponding parts in all the views.

Figure 1:
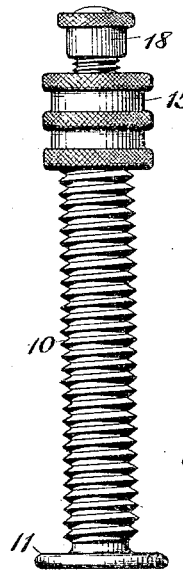
Figures 6, 7:
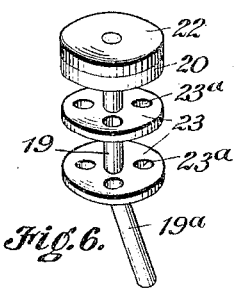
Figure 2:
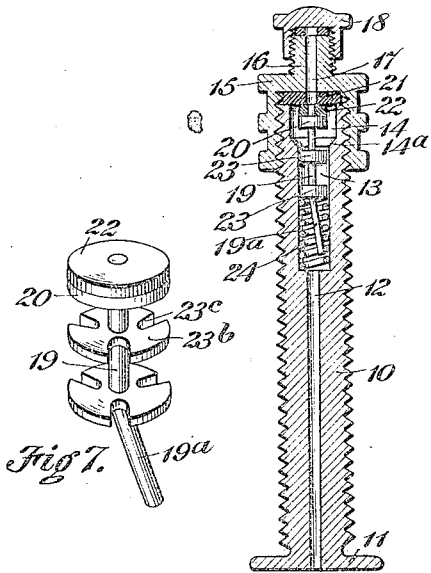
Figure 3:
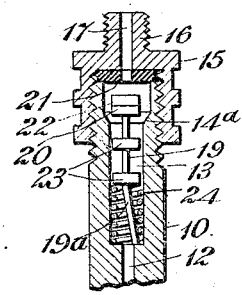
Figure 4:
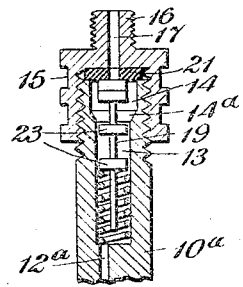
Figure 5:
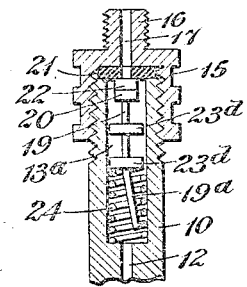

Figure 1 is a side elevation of a valve embodying my invention; Fig. 2 is a longitudinal section showing the valve in the closed position; Fig. 3 is a fragmentary longitudinal section showing the valve off its seat, as when the tire is being inflated; Fig. 4 is a fragmentary view showing the valve seated and illustrating a slight modification in the arrangement of the valve stem and the bore of the valve body; Fig. 5 is a view similar to Fig. 4, but illustrating a modification in the form of the valve chamber; Fig. 6 is a perspective view of the valve; and Fig. 7 is a view similar to Fig. 6, but illustrating a slightly modified form of the valve.

In constructing a tire valve in accordance with my invention, the valve stem or body 10 may be in general of any approved form and dimensions, and in practice will be provided with any known form of fastening means, there being shown in the present instance, the usual flange 11 at one end. A longitudinal through-bore 12 is formed in the body, and a valve chamber 13 is produced complementary to the said bore and of larger diameter. The outer end of the chamber is enlarged as at 14. Threaded on the body is a bonnet 15, having a nipple 16, the said bonnet and nipple having a longitudinal port 17 for the ingress and egress of air. The nipple is threaded to receive a dust cap 18 or to connect with the pump when the cap is removed.

A valve stem 19 is disposed longitudinally in the valve chamber 13, 14, and carries a valve 20 disposed in the enlarged end 14 of the chamber. The bonnet 15 forms a valve seat for the valve 20 and may have a washer or packing disk 21. Similarly the valve 20 may have a washer 22 to contact with the disk 21.

In order to give guided parallel movement to the valve stem in the opening and closing of the valve, said stem is provided with spaced collars or disks 23, a compression spring 24 being provided beneath the inner collar 23, the spring normally tending to maintain the valve in the closed position. The valve 20 is of less diameter than the enlarged end 14 of the valve chamber, so that air may pass freely around the said valve when off its seat, and the collars 23 are formed with openings 23ª (see Fig. 6) for the passage of air in either direction. The openings 23ª in the form shown in Fig. 6 are in the form of orifices. In the form shown in Fig. 7, however, disks 23ᵇ are employed, having peripheral recesses 23ᶜ. The bottom of the enlarged portion 14 of the valve chamber is beveled as at 14ª, to guide the collars 23 in inserting the valve stem in the chamber 13.

It will be observed that the inner end 19ª of the valve stem is so disposed relatively to the bore 12 of the valve body as not to obstruct said bore. Thus in Figs. 2 and 3, the bore 12 is axial and the inner end 19ᵃ of the valve stem is deflected laterally so that its inner end is out of alinement with the bore. In the form shown in Fig. 4 the bore 12ᵃ of the body 10ᵃ is eccentric, while the stem continues straight co-axially with the body. In both forms it will be seen that when the valve moves inward under the pressure of incoming air, the inner end of the valve stem will contact with the bottom of the valve chamber 13, at one side of the bore and will thus limit the inward movement of the valve.

In the form shown in Fig. 5, the valve is the same as in Figs. 2 and 3, but the valve chamber 13ᵃ is of uniform diameter throughout, the said bore being of greater diameter than the valve 20 and its washer 22 to permit the passage of air around the valve, while the collars 23ᵈ are of a diameter to snugly fit the chamber. It is to be understood that the collars 23ᵈ in practice, have the same openings as shown in Fig. 6, for the passage of air therethrough.

Having thus described my invention, I claim as new and desire to secure by Letters Patent:

1. An air valve comprising a valve body having a through-bore and a valve chamber at the outer end complementary to the bore and of larger diameter, a valve stem longitudinally disposed in the said valve chamber and having a valve at the outer end thereof, a bonnet on the body having a port for the ingress and egress of air and forming a valve seat for the said valve, the said bonnet having a nipple adapted to receive a cap or to connect with a pump, the said valve stem being formed with spaced guide collars inward from the valve, a spring beneath the outer collar, the said valve stem at its inner end being out of alinement with the bore of the valve body and adapted to contact with the bottom of the valve chamber upon an inward movement of the valve to limit said inward movement.

2. An air valve comprising an elongated body having a through-bore and formed with a valve chamber complementary to the bore and of large diameter, a valve stem longitudinally disposed in said chamber and carrying a valve at its outer end, spaced collars on the stem snugly fitting the valve chamber and provided with openings for the passage of air, the stem of the valve projecting inwardly beyond the innermost collar and being out of alinement with the bore of the body and movable into contact with the bottom of the valve chamber when the valve is opened, a spring beneath the innermost collar, and a bonnet on the valve body adapted to receive a dust cap or to connect with a pump, said bonnet having a port for the passage of air and constituting a seat for the valve.

In testimony whereof I have signed my name to this specification in the presence of two subscribing witnesses.

WARD EATON HEDGER.

Witnesses:
   W. O. TENNEY,
   B. S. CHOAT.